United States Patent
Anderson et al.

(10) Patent No.: US 6,541,051 B2
(45) Date of Patent: Apr. 1, 2003

(54) PREPARATION OF METAL COMPLEXES OF AMINO ACIDS OBTAINED BY HYDROLYSIS OF SOY PROTEIN

(75) Inventors: Michael D. Anderson, Eden Prairie, MN (US); Mahmoud M. Abdel-Monem, Moscow, ID (US)

(73) Assignee: Zinpro Corporation, Eden Prairie, MN (US)

( * ) Notice: Subject to any disclaimer, the term of this patent is extended or adjusted under 35 U.S.C. 154(b) by 48 days.

(21) Appl. No.: 09/867,140

(22) Filed: May 30, 2001

(65) Prior Publication Data

US 2002/0192336 A1 Dec. 19, 2002

(51) Int. Cl.$^7$ .......................... A23L 1/304; A23L 1/305
(52) U.S. Cl. .......................... 426/74; 426/634; 426/656
(58) Field of Search .......................... 426/74, 634, 656

(56) References Cited

U.S. PATENT DOCUMENTS

| | | |
|---|---|---|
| 3,941,818 A | 3/1976 | Abdel-Monem |
| 3,950,372 A | 4/1976 | Abdel-Monem |
| 4,021,569 A | 5/1977 | Abdel-Monem |
| 4,039,681 A | 8/1977 | Abdel-Monem |
| 4,067,994 A | 1/1978 | Anderson |
| 4,670,269 A | 6/1987 | Abdel-Monem |
| 4,678,854 A | 7/1987 | Abdel-Monem |
| 4,874,893 A | 10/1989 | Flork |
| 4,900,561 A | 2/1990 | Abdel-Monem |
| 4,948,594 A | 8/1990 | Abdel-Monem |
| 4,956,188 A | 9/1990 | Anderson |
| 5,061,815 A | 10/1991 | Leu |
| 5,278,329 A | 1/1994 | Anderson |
| 5,583,243 A | 12/1996 | Abdel-Monem |
| 5,698,724 A | 12/1997 | Anderson |

*Primary Examiner*—Helen Pratt
(74) *Attorney, Agent, or Firm*—McKee, Voorhees & Sease, P.L.C.

(57) ABSTRACT

Trace element/amino acid complexes are prepared from a processable blend of soy isolate and soy concentrate with the amount of soy concentrate not exceeding 50% by weight of the blend.

15 Claims, No Drawings

PREPARATION OF METAL COMPLEXES OF AMINO ACIDS OBTAINED BY HYDROLYSIS OF SOY PROTEIN

FIELD OF THE INVENTION

The invention relates to the field of animal feed supplements and more particularly to preparing metal complexes of amino acids from soy protein hydrolysates.

BACKGROUND OF THE INVENTION

The importance of the trace elements copper, iron, manganese and zinc in animal nutrition has long been recognized. Maintaining the health and well being of domestic animals and poultry requires that these essential elements be present in the diet in sufficient amounts and in a biologically available form. Because common feed ingredients may be deficient in these elements, supplemental amounts of the elements are added to the feed of domestic animals and poultry. Many commercial feed additives have been developed to provide the essential elements in forms that are readily biologically utilizable. The degree of biological availability that is the extent nutrients are actually in a form that can be assimilated and used is often referred to as "bioavailability". Bioavailability depends on the physical and chemical properties of the form in which the nutrient is present in the diet. Increased bioavailability of supplemental essential metals is beneficial because it allows the use of lower concentration of the additive in the diet to meet the nutritional needs of animals, while at the same time lowering the potential harmful effects of high levels of the trace metals both on the animals and on the environment.

Several commercial products are available in which trace elements are more bioavailable than the corresponding inorganic source of the metal. The enhanced bioavailability is attributed to the association of the metal with an organic molecule, generally known as ligand. This association or bonding modifies the physical and chemical properties of the metal resulting in increased solubility, enhanced stability in the gut, improved absorption into circulation and increased metabolic utilization.

The common assignee of the present application has in the past synthesized and patented metal complexes of amino acids as a more bioavailable source of the essential elements. The following are examples of these patents: U.S. Pat. Nos. 3,941,818; 3,950,372; 4,021,569; 4,039,681; and 4,067,994 disclose 1:1 complexes of alpha amino acids, preferably DL-methionine with the transition metals zinc, chromium, manganese and iron. The formation of similar complexes with L-methionine is disclosed in U.S. Pat. No. 5,278,329. U.S. Pat. Nos. 4,900,561 and 4,948,594 disclose copper complexes of alpha amino acids containing terminal amino groups. Complexes of copper, manganese, zinc and iron with alpha hydroxyl aliphatic carboxylic acids are disclosed in U.S. Pat. Nos. 4,956,188 and 5,583,243. U.S. Pat. Nos. 4,670,269 and 4,678,854 disclose complexes of cobalt with poly-hydroxyl carboxylic acid such as glucoheptanoic acid. Complexes of the amino acid L-lysine with trace elements are disclosed in U.S. Pat. No. 5,061,815. The effectiveness of the compounds disclosed in these patents has been demonstrated from data provided in these patents themselves and in numerous scientific publications and technical reports.

The above patents describe the use of pure synthetic or natural amino or hydroxyl acids. In U.S. Pat. No. 5,698,724 the assignee of the current application disclosed the synthesis of complexes of essential elements with natural amino acids obtained by the hydrolysis of proteins in general. Since this patent was issued, a large number of field studies have demonstrated that trace elements from these complexes are more bioavailable than such metals from inorganic sources. The art disclosed in U.S. Pat. No. 5,698,724 has worked well for the large-scale production of various metal amino acid complexes from a variety of readily available proteins. However, in 1998 the European Union approved the use of a group of trace element chelates of amino acids as feed additives but only under certain conditions. The approved additives include copper, iron, manganese and zinc chelates of amino acids. The source of the amino acids used in preparing these chelates is restricted to hydrolyzed Soya Protein.

Many technical difficulties were encountered in applying the general art disclosed in U.S. Pat. No. 5,698,724 for the preparation of the trace element chelates of amino acids from commonly commercially available sources of Soya Protein. These technical difficulties required specialized conditions for soy protein based product especially targeted for the European market.

Soy Protein is available in a number of grades that contain different concentrations of protein. Soy Protein Concentrate is a commercially available product obtained by removing most of the oil, ash and fiber. Most of the soy carbohydrate remains in the Concentrate. Typically, Soy Protein Concentrate contains about 65% protein, about 25% carbohydrates and the balance is oil, ash and fiber. Soy Protein Isolate is another readily commercially available grade of soy protein obtained by removing most of the carbohydrates, fiber and fat from soy. Typically, Soy Protein Isolate contains about 90% protein, less than 5% carbohydrate and the balance is oil, ash and fiber. The difference between these two grades of soy protein is the higher concentration of protein in the Isolate and higher concentration of carbohydrates in the Concentrate. The physical properties of these two forms are significantly different and these differences impact the suitability of the product for use as the source of amino acids in the preparation of trace element metal complexes.

For example, the presence of high concentrations of carbohydrates in the Soy Protein Concentrate resulted in the formation of viscous residue and heavy precipitate during acid hydrolysis. This complicated the efficient formation of the metal amino acid complexes and uniform distribution of the liquid formed after the formation of the complexes on the carrier for drying. Additionally the relatively low protein content of the "Concentrate" limited the amount of metal amino acid chelates that could be incorporated in the final product.

The Soy Protein Isolate also has some special process concerns. It has a relatively high concentration of protein and low concentration of carbohydrates that makes it a potentially acceptable protein source for the preparation of the metal amino acid chelates, however, this product has a relatively low bulk density and wetability that presents technical difficulties in mixing the bulky powder with a relatively small volume of acid required for hydrolysis. It can therefore be seen there exists a continuing need for process improvements to make both soy protein concentrate and soy isolate useable in the process of making trace element/amino acid chelates.

Accordingly, the primary objective of this invention is to provide a practical method for processing the soy protein source and efficiently hydrolyzing such a source to obtain amino acids to form trace element/chelates that meet the specifications of the European Union Countries.

Another objective of this invention is to provide a simple and economical method to control the manufacturing process to maximize the amount of metal amino acid complexes produced.

A yet further specific objective of this invention is to provide for a safe and simple method for the preparation of copper amino acid complexes after protein hydrolysis with sulfuric acid.

Turning next to iron, large-scale production of iron amino acid complexes from commercial grade iron oxide according to the teachings of U.S. Pat. No. 5,698,724 was not practical because of the harsh conditions required to dissolve the iron oxide. Additionally, amino acid complexes of Fe (II) could not be prepared by using the methods described in U.S. Pat. No. 5,698,724. It is necessary to develop a novel method for the preparation of iron, especially Fe (II) amino acid complexes from hydrolyzed Soy protein as well as other protein sources.

Another objective of this invention is to provide for a practical method for the preparation of iron, especially iron (II) complexes of amino acids obtained by hydrochloric acid hydrolysis of proteins, including Soy protein.

SUMMARY OF THE INVENTION

A practical method is described for the efficient hydrolysis of commercially available sources of Soy Protein and subsequent formation of metal amino acid complexes. The method involves the use of a mixture of the two common grades of Soy protein to provide a blend that contains the required concentration of protein and has the optimal physical characteristic. The blend is added to a hot well-agitated solution of acid. After the solids are mixed with the acid the solution is heated at temperatures between 100–150° C. for 1–12 hours until the protein is completely hydrolyzed to single amino acids.

To optimize the manufacturing process and maximize the concentration of the metal-amino acid complexes in the product, the amount of acid used for hydrolysis must be controlled. The amino acid composition of the protein is determined prior to hydrolysis and the total number of moles of all amino acids present in the protein source is calculated. The amount of metal required to form the desired metal-amino acid complexes is calculated and the equivalent amount of acid to solubilize the metal is determined. This invention negates the necessity of using a base to neutralize excess acid and adjust the solution to the pH required for the optimum formation of the metal complexes.

According to this invention a method is described for the preparation of copper-amino acid complexes after hydrolysis of Soy protein with sulfuric acid. Sulfuric acid 6–8 N is used for hydrolysis. The mixture of acid and protein are heated at 100–150° C. for 1–12 hours. Copper oxide is added to the acid hydrolysis solution to form the copper-amino acid complexes.

A simple method is described for the preparation of iron (II)-amino acid complexes from the product of hydrochloric acid hydrolysis of Soy protein. Soy protein is hydrolyzed with hydrochloric acid as described above. The product of hydrolysis is then treated with calcium hydroxide to form the calcium-amino acid complexes. Ferrous sulfate is added. Calcium Sulfate is formed and precipitated. The ferrous-amino acid complex is formed and remains in solution. The product is dried on a carrier.

DETAILED DESCRIPTION OF THE PREFERRED EMBODIMENT

Two grades of Soy protein are readily commercially available at a reasonable cost. These are Soy Protein Concentrate and Soy Protein Isolate. Soy Protein Concentrate is free flowing and mixes well with water. As earlier mentioned, the presence of high concentrations of carbohydrates in the Soy Protein Concentrate resulted in the formation of a viscous heavy residue during hydrolysis. The presence of the heavy residue complicated the efficient formation of the metal amino acid complexes and uniform distribution of the liquid formed after the formation of the complexes on the carrier for drying. Also as earlier mentioned, Soy Protein Isolate has a relatively low bulk density and wetability. This product did not mix well when added to the acid solution and made the hydrolysis inefficient. To overcome the difficulties associated with using either of these soy amino acid source products we found that a mixture of the two product minimizes the undesirable properties of each. A preferred mixture composed of 80% Soy Protein Isolate and 20% Soy Protein Concentrate contains protein in sufficiently high concentration and carbohydrates in sufficiently low concentration to make it suitable for the preparation of metal-amino acid complexes. Generally, the mix can be from 50% to 80% soy isolate and from 20% to 50% soy concentrate. Preferably the amount of concentrate should generally not exceed 50% or process problems may occur.

Efforts to mix the blend of the soy protein sources with the acid solution using the same procedures used with other protein sources were unsuccessful. The addition of the blend to the acid solution at room temperature resulted in the soy protein forming a heavy gelatinous mass that did not go in solution on heating. The addition of the soy protein source to a vigorously agitated acid solution at room temperature resulted in the formation of a heavy gelatinous mass that resisted agitation and was not readily soluble on heating. Only when the acid solution was heated to temperatures above 70° C. and the soy protein was added slowly with vigorous agitation did the solids uniformly distributed in the acid solution. Continued heating resulted in dissolving most of the solids and the complete hydrolysis of the protein to the desired amino acids. The product contained only a small amount of suspended solids (10–12% of the weight of Soy Protein used). The acid solution here mentioned is used for the formation of the metal-amino acid complex as described in the examples later described herein.

The relatively high costs of the soy protein products and the strict specifications for products approved for use in the European Union countries requires that the production process is carefully controlled and operated to make these products commercially viable. To maximize the concentration of metal amino acids in these products, the amount of acid required for hydrolysis must be closely scrutinized. The amount of acid must be just enough to effectively hydrolyze the protein source and then form the necessary amount of metal salt to react with the amino acids produced from protein hydrolysis. If the amount of acid used exceeds the amount required to form the metal complexes, the pH of the reaction mixture must be adjusted with appropriate base to a range required for optimum stability of the metal amino acid complexes. This results in lowering the maximum concentration of the metal amino acid complexes that can be accommodated in the final product. Therefore, in this sense, using the correct amount of acid is important for maximizing the amount of the complexes in the product.

In previous studies it was determined that the maximum hydrolysis of protein is observed when the volume of the acid is at least twice the weight of protein (see U.S. Pat. No. 5,698,724). Additionally, the total weight of the reaction mixture after the formation of complex determines the minimum weight of a carrier that can be added for effective drying of the product. These two factors taken together explain the importance of controlling the amount of acid used to maximize the concentration of the metal amino acid in the final product. To optimize the manufacturing process and maximize the concentration of the metal amino acid complexes in the product, the amount of acid used for hydrolysis must be calculated very carefully. The amino acid composition of the protein is determined prior to hydrolysis and the total number of moles of all amino acids present in a unit weight of the protein source is calculated. The amount of metal required to form the desired metal amino acid complexes is calculated. The number of moles of the metal required will depend on the number of moles of amino acids present in the protein and the type of complex desired. To form the 1:1 metal amino acid complexes, the number of moles of metal source required equals the number of moles of amino acids present. To form the 1:2 metal amino acid complexes, the number of moles of the metal source will equal ½ the number of moles of the amino acids present. To maximize the concentration of the complex in the product, the amount of acid used to hydrolyze the protein should equal the amount necessary to react with the metal and the volume of acid used should equal or exceed twice the weight of protein. The desired amount of acid is prepared in the optimum concentration for hydrolysis of protein. This is found to be 6N for hydrochloric acid and 6–8N for sulfuric acid. The use of the exact stoichiometric amount of acid required to dissolve the metal negates the necessity of using a base such as sodium hydroxide to neutralize excess acid and adjust the solution to the pH required for the optimum formation of the metal complexes as described in U.S. Pat. No. 5,698,724.

After the soy isolate/concentrate blend has been acid hydrolyzed to single amino acid moieties, it is ready to use in forming the complexes or ligands with sources of trace elements such as soluble salts of copper, iron, manganese and zinc. From this point forward, the process of our earlier patents can be used. Generally the soluble trace element is added with some heating and mixing until it dissolves. Often it is heated up to about 100° C. for an hour and then cooled. Thereafter, the mixture can be added to a carrier if desired to make a homogenous product.

Suitable soluble sources of the desired trace elements can include oxides and inorganic acid salts of the respective metals. For example, one may use zinc oxide, copper oxide, etc. or soluble salts such as ferrous sulfate, manganese sulfate, etc. The production of copper amino acid complexes from amino acids produced by protein hydrolysis represents a technical challenge. This is the case whether the protein source is soy protein or another appropriate protein source. Although several mineral acids can be used for protein hydrolysis, it is generally accepted that hydrochloric acid is the acid of choice to maximize the production of the metal amino acid complexes. However, the addition of strong oxidizing substance such as copper oxide as described in U.S. Pat. No. 5,698,724 to the mixture of hydrolyzed protein containing hydrochloric acid involves significant risk and must be done very carefully. Copper oxide is capable of oxidizing hydrochloric acid to provide chlorine gas with the concomitant formation of copper metal. This will not only lower the quality of product but also represent an environmental hazard. The use of sulfuric acid for protein hydrolysis is described in U.S. Pat. No. 4,874,893. However, high concentrations of the acid (12N sulfuric acid) were required for efficient hydrolysis. This was attributed to the fact that sulfuric acid has two proton dissociation constants. The second dissociation constant is reported to be too low to participate in protein hydrolysis. Since maximum metal amino acid complex formation requires that the concentration of acid used be between 6N and 8N, the use of sulfuric acid was not explored in the past.

This invention describes the successful hydrolysis of protein using lower concentrations of acid to maximize the concentration of the copper amino acid complex in the final product. Sulfuric acid in concentrations from 6N to 8N was used for the efficient hydrolysis of protein including Soy protein. Complete hydrolysis was observed after heating the acid protein mixture at 100–140° C. for 1–12 hours. The addition of copper oxide to the sulfuric acid solution of amino acids resulted in the smooth dissolution of the oxide and formation of copper amino acid complex.

Large-scale production of iron amino acid complexes from iron oxide according to U.S. Pat. No. 5,698,724 was not practical. Commercially available iron oxide required harsh conditions to dissolve in the acid solution obtained after protein hydrolysis. Additionally, amino acid complexes of iron (II) could not be obtained by using the methods described in U.S. Pat. No. 5,698,724. In this invention we describe a method for the preparation of iron amino acid complexes from ferrous or ferric sulfate and protein hydrolyzates. Soy protein is hydrolyzed by using 6N hydrochloric acid as described in the present invention. Calcium hydroxide is added in sufficient quantity to neutralize the acid and form the calcium amino acid complex. To this mixture, an equivalent amount of the Ferric or Ferrous sulfate is added with vigorous agitation. An exchange reaction takes place between the chloride ions in solution and the sulfate ions from the iron salt resulting in the precipitation of calcium sulfate and the formation of the iron amino acid complexes. The precipitated calcium sulfate is removed by filtration and the filtrate is dried over the appropriate carrier.

Appropriate trace element amino acid carriers are well known and suitably described in our earlier patents and so a detailed description need not be given here. One such example as demonstrated in the examples is feather meal protein.

The following examples are offered to illustrate but not limit the invention. It goes without saying that certain modifications can be made and still achieve the benefits of the invention.

EXAMPLE 1

Hydrolysis of Soy Protein Concentrate with 6N Hydrochloric Acid

In a 1-L 3-neck round bottom flask equipped with a reflux condenser, addition funnel and thermometer was added 200-ml of 6N hydrochloric acid. The liquid was stirred vigorously with a magnetic stirrer. A 100 g of Soy Protein Concentrate was added slowly with vigorous stirring. The mixture was heated with continued stirring to 100° C. at maintained at this temperature for 12 hours. The majority of the solids disappeared after one hour of heating with the formation of a dark thick residue. The mixture was cooled and filtered through a weighed filter crucible. The filter washed with distilled water collecting the washings in the same filter flask. The filter was dried and weighed. The weight of the filtrate was determined and the amino acid and protein content of the filtrate were determined. The residue weighed 24.916 g accounting for 24.92% of the protein added. The filtrate weighed 338.680 g. The filtrate contained 0.7087% protein and 12.945% amino acids. This corresponds to 2.40% protein and 43.84% amino acids of the original weight of the Soy Protein Concentrate used.

EXAMPLE 2

Preparation of Zinc Amino Acid Complex from Hydrochloric Acid Hydrolyzed Soy Protein Concentrate In a 1-L 3-neck round bottom flask equipped with a reflux condenser, addition funnel and thermometer was added 200-ml of 6N hydrochloric acid. The liquid was stirred vigorously with a magnetic stirrer. A 100 g of Soy Protein Concentrate was added slowly with vigorous stirring. The mixture was heated with continued stirring to 100° C. at maintained at this temperature for 12 hours. The majority of the solids disappeared after 1 hour of heating with the formation of a dark thick residue. The mixture was cooled to nearly 50° C. with continued stirring. A 38.672 g of zinc oxide was added slowly with continued stirring. After all the zinc oxide dissolved, the reaction mixture was heated slowly to 100° C. and maintained at this temperature for 1 hour. The mixture was cooled to room temperature. The pH of the mixture was 2.137. A 20 g of a 50% sodium hydroxide was added slowly. The pH of the solution was 3.086. The mixture was added to 150 g of a carrier blend with vigorous mixing to give a homogenous wet product. The mixture was dried at 80° C. for 24 hours.

Zinc Content=8.953%, Zinc-Amino Acid Complex= 6.998%, Bound=78.16%

The amount of acid used was the minimum that can be used. The amount of zinc oxide added is the maximum that could be used based on the protein concentration in the Soy Protein Concentrate. The theoretical yield of zinc is 9%. Zinc recovery was 99.48%. The low yield of zinc amino acid complex is the result of low amino acid content and low hydrolysis efficiency because of the presence of degraded carbohydrate.

EXAMPLE 3

Hydrolysis of Soy Protein Isolate with 6N Hydrochloric Acid

In a 1-L 3-neck round bottom flask equipped with a reflux condenser, addition funnel and thermometer was added 200-ml of a 6N hydrochloric acid. The liquid was stirred vigorously with a magnetic stirrer. A 100 g of Soy Protein Isolate was added slowly with vigorous stirring. The Soy Protein Isolate did not mix with the acid and formed a heavy gelatinous mass that prevented the stirring of the mixture. The mixture was heated slowly to 100° C. under reflux. The soy protein did not go into solution and caused pumping that resulted from the solids adhering on the inside of the flask.

EXAMPLE 4

Hydrolysis of Soy Protein Isolate with 6N Hydrochloric Acid

In a 1-L 3-neck round bottom flask equipped with a reflux condenser, addition funnel and thermometer was added 213-ml of 6N hydrochloric acid. The liquid was stirred vigorously with a magnetic stirrer and heated to 70–80° C. A 100.045 g of Soy Protein Isolate was added slowly with vigorous stirring. The mixture was heated with continued stirring to 100° C. and maintained at this temperature for 12 hours. The majority of the solids disappeared after 1 hour of heating with the formation of a dark residue. The mixture was cooled and filtered through a weighed filter crucible. The filter was washed with distilled water and the washings were collected in the same filter flask. The filter was dried and weighed. The weight of the filtrate was determined and the amino acid and protein content of the filtrate were determined. The residue weighed 10.216 g accounting for 10.22% of the protein added. The filtrate weighed 425.686 g. The filtrate contained 0.7371% protein and 16.794% amino acids. This corresponds to 3.14% protein and 71.49% amino acids of the original weight of the Soy Protein Isolate used.

EXAMPLE 5

Preparation of Zinc Amino Acid Complex from Hydrochloric Acid Hydrolyzed Soy Protein Isolate In a 1-L 3-neck round bottom flask equipped with a reflux condenser, addition funnel and thermometer was added 213-ml of 6N hydrochloric acid. The liquid was stirred vigorously with a magnetic stirrer and heated to 70–80° C. A 100 g of Soy Protein Isolate was added slowly with vigorous stirring. The mixture was heated with continued stirring to 100° C. and maintained at this temperature for 12 hours. The majority of the solids disappeared after 1 hour of heating with the formation of a dark residue. The mixture was cooled to nearly 50° C. with continued stirring. A 52.216 g of zinc oxide was added slowly with continued stirring. After all the zinc oxide dissolved, the reaction mixture was heated slowly to 100° C. and maintained at this temperature for 1 hour. The mixture was cooled to room temperature. The mixture was added to 52.230 g of a carrier blend with vigorous mixing to give a homogenous wet product. The mixture was dried at 80° C. for 24 hours.

Zinc Content=10.16%, Zinc-Amino Acid Complex= 9.39%, % Bound=92.39%

EXAMPLE 6

Hydrolysis of a Blend of Soy Protein Isolate and Soy Protein Concentrate with 6N Hydrochloric Acid In a 1-L 3-neck round bottom flask equipped with a reflux condenser, addition funnel and the thermometer was added 213-ml of 6N hydrochloric acid. The liquid was stirred vigorously with a magnetic stirrer and heated to 70–80° C. A blend made of 80 g of Soy Protein Isolate and 20 g of Soy Protein Concentrate was added slowly with vigorous stirring. The mixture was heated with continued stirring to 100° C. and maintained at this temperature for 12 hours. The majority of the solids disappeared after 1 hour of heating with the formation of a dark residue. The mixture was cooled and filtered through a weighed filter crucible. The filter was washed with distilled water and the washings were collected in the same filter flask. The filter was dried and weighed. The weight of the filtrate was determined and the amino acid and protein content of the filtrate were determined. The residue weighed 10.882 g accounting for 10.89% of the protein added. The filtrate weighed 382.574 g. The filtrate contained 0.7151% protein and 17.028% amino acids. This corresponds to 2.74% protein and 65.18% amino acids of the original weight of the Soy Protein Blend used.

EXAMPLE 7

Preparation of Zinc Amino Acid Complex from Hydrochloric Acid Hydrolyzed Blend of Soy Protein Isolate and Soy Protein Concentrate In a 1-L 3-neck round bottom flask equipped with a reflux condenser, addition funnel and thermometer was added 213-ml of 6N hydrochloric acid. The liquid was stirred vigorously with a magnetic stirrer and heated to 70–80° C. A Blend composed of 80 g Soy Protein Isolate and 20 g Soy Protein Concentrate was added slowly with vigorous stirring. The mixture was heated with continued stirring to 100° C. and maintained at this temperature for 12 hours. The majority of the solids disappeared after 1 hour of heating with the formation of a dark residue. The mixture was cooled to nearly 50° C. with continued stirring. A 49.512 g of zinc oxide was added slowly with continued stirring. After all the zinc oxide dissolved, the reaction mixture was heated slowly to 100° C. and maintained at this temperature for 1 hour. The mixture was cooled to room temperature. The mixture was added to 146.596 g of a carrier blend with vigorous mixing to give a homogenous wet product. The mixture was dried at 80° C. for 24 hours.

Zinc Content=11.19%, Zinc-Amino Acid Complex= 9.756%, % Bound=87.19%

EXAMPLE 8

Calculation of Optimum Amount of Acid and Metal to Maximize the Amount of Metal-Amino Acid Complex Formed, Protein Hydrolysis Feather Meal was used was used as the protein source in this example. A sample of the product was submitted for total amino acid analysis and the results are reported in the columns labeled "Protein Source" in Table 1. In the first column under "Protein Source" the concentrations of amino acids in "g/100 g" protein is listed. The calculated concentration in "mmoles/100 g" is reported in the second column for each of the amino acids. The total concentration of amino acids in the protein in g/100 g and mmoles/100 g are reported at the bottom of the respective column. Based on extensive studies, we typically obtain 90% recovery of the amino acids in the protein after acid hydrolysis. Since the protein was found to contain 667.14 mmoles of amino acids per 100 g of protein, the amount of amino acids recovered after hydrolysis will be sufficient to react with 600 mmoles of zinc to form amino acid-complexes. The amount of acid required to dissolve the metal would be 1200 mmoles. Therefore, the protein was subjected to hydrolysis with 6N Hydrochloric Acid (1.2 moles of acid/100 g protein) at 140° C. for 1 hour. A sample of the amino acids solution was submitted for analysis and the results are reported in the columns labeled "Acid Hydrolysate". In the first column under "Acid Hydrolysate", the concentration of amino acids in "g/100 g" of the solution is reported. The calculated concentration in "mmoles/100 g" is reported in the second column. Since the exact amount of protein added to the acid before hydrolysis is known, the concentration of amino acids in the acid hydrolysate expressed as g/100 g and mmoles/100 g of the original protein is calculated and reported at the bottom of the respective column. The % hydrolysis is calculated from the concentration of amino acid found in the protein source before hydrolysis and the concentration of amino acids found in the acid hydrolysate. In this example, 87.09% of the amino acids expressed as g/100 g of the protein were recovered in the acid hydrolysate. If expressed as mmoles/100 g protein, 90.09% of the amino acids in protein were recovered in the acid hydrolysate.

TABLE 1

| Amino Acid | Formula Weight | Protein Source g/100 g | Protein Source mmoles/100 g | Acid Hydrolysate g/100 g | Acid Hydrolysate mmoles/100 g |
|---|---|---|---|---|---|
| Aspartic Acid | 133.1 | 5.47 | 41.10 | 1.55 | 11.65 |
| Threonine | 119.12 | 3.76 | 31.56 | 0.99 | 8.31 |
| Serine | 105.09 | 10.04 | 95.54 | 2.75 | 26.17 |
| Glutamic Acid | 147.13 | 8.25 | 56.07 | 2.21 | 15.02 |
| Proline | 115.13 | 9.68 | 84.08 | 2.32 | 20.15 |
| Glycine | 75.07 | 6.62 | 88.18 | 1.96 | 26.11 |
| Alanine | 89.09 | 2.99 | 33.56 | 1.17 | 13.13 |
| Cystine | 240.3 | 3.74 | 15.56 | | 0.00 |
| Valine | 117.15 | 6.34 | 54.12 | 1.38 | 11.78 |
| Methionine | 149.21 | 0.38 | 2.55 | 0.38 | 2.55 |
| Isoleucine | 131.18 | 3.83 | 29.20 | 0.89 | 6.78 |
| Leucine | 131.18 | 6.62 | 50.47 | 1.74 | 13.26 |
| Tyrosine | 181.19 | 2.31 | 12.75 | 0.61 | 3.37 |
| Phenylalanine | 165.19 | 4.19 | 25.36 | 1.11 | 6.72 |
| Histidine | 155.16 | 0.65 | 4.19 | 0.17 | 1.10 |
| Lysine | 146.19 | 1.43 | 9.78 | 0.35 | 2.39 |
| Arginine | 174.2 | 5.76 | 33.07 | 1.43 | 8.21 |
| Total | | 82.06 | 667.14 | 21.01 | 176.70 |
| Adjusted Amino Acid Content in the Acid Hydrolysate | | | | 71.46 | 601.01 |

EXAMPLE 9

Preparation of Zinc-Amino Acid Complexes from the Product of Hydrochloric Acid Hydrolysis of Feather Meal Protein A sample of Feather Meal Protein tested in Example 7 was subjected, on a large-scale to hydrolysis with 6N Hydrochloric Acid according to the formula shown in TABLE 2. The required amount of 6N Hydrochloric Acid was heated to 70° C. with vigorous agitation. The Feather Meal protein was added with continued heating and agitation. The reaction mixture was heated at 140° C. for 1 hour. The reaction mixture was cooled and a sample of the liquid was removed. A 320 g sample was heated to about 70° C. and zinc oxide (50.890 g) was added slowly with continued agitation. After all the zinc oxide was added the mixture was heated at 100° C. for 1 hour. The liquid was added to 200 g of carrier and dried at 80° C. for 24 hours.

A sample of the dried product was analyzed and found to contain:

1) Water Extractable Zinc=10.13%
2) Zinc-Amino Acid Complex=10.05%
3) Total Amino Acids=27.62%
4) Percent of Metal Present as Amino Acid Complex= 99.28%

TABLE 2

| Ingredient | F. Wt. | Moles | Purity | Wt. | Solids | Metal | % Metal |
|---|---|---|---|---|---|---|---|
| Protein Meal | | 0.601 | | 100.000 | 100.000 | | |
| Hydrochloric Acid (31.5%) | 36.45 | 1.202 | 0.315 | 139.089 | 42.561 | | |
| Water | | | 83.453 | | | | |
| Zinc Oxide | 81.39 | 0.601 | 0.961 | 50.890 | 39.293 | 39.293 | 10.24 |
| Subtotal | | | | 373.432 | 181.854 | | |
| Carrier Blend | | | | 202.000 | 202.000 | | |
| Total | | | | 575.432 | 383.854 | | |

EXAMPLE 10

Preparation of Copper Amino Acid Complex from Sulfuric Acid Hydrolyzed Soy Protein Isolate In a 1-L 3-neck round bottom flask equipped with a reflux condenser, addition funnel and thermometer was added 229-ml of 6N Sulfuric Acid prepared by adding 64 g of Concentrated Sulfuric Acid (93%) to 165-ml of distilled water. The liquid was stirred vigorously with a magnetic stirrer and heated to 70–80° C. A 100 g of Soy Protein Isolate was added slowly with vigorous stirring. The mixture was heated with continued stirring to 100° C. and maintained at this temperature for 24 hours. The majority of the solids disappeared after 1 hour of heating with the formation of a dark residue. The mixture was cooled to nearly 50° C. with continued stirring. A 47.822 g of copper oxide was added slowly with continued stirring. After all the copper oxide dissolved, the reaction mixture was heated slowly to a gentle boil and maintained at this temperature for 1 hour. The mixture was added to 157.196 g of a carrier blend with vigorous mixing to give a homogenous wet product. The mixture was dried at 80° C. for 24 hours.

The sample was analyzed and found to contain:
1) Water Extractable Copper=9.063%
2) Copper-Amino Acid Complex=8.97%
3) Percent of Copper present as Copper-Amino Acid Complex=99.01%

EXAMPLE 11

Preparation of Iron (II)-Amino Acid Complexes from the Product of Hydrochloric Acid Hydrolysis of Feather Meal Protein A sample of Feather Meal Protein tested in Example 7 was subjected to hydrolysis with 6N Hydrochloric Acid according to the formula shown in TABLE 3. The required amount of 6N Hydrochloric Acid was heated to 70° C. with vigorous agitation. The Feather Meal protein was added with continued heating and agitation. The reaction mixture was heated at 140° C. for 1 hour. The reaction mixture was cooled and a sample of the liquid was removed. A 322 g sample was heated to about 70° C. and calcium hydroxide (44.978 g) was added slowly with continued agitation. After all the calcium hydroxide was added the mixture was heated at 70° C. for 1 hour. Ferrous sulfate (167.090 g) was added and the heating was continued with agitation. A heavy precipitate formed and settled at the bottom as soon as the agitation was stopped. The mixture was filtered and the precipitate was washed with water and the washings were added to the original filtrate. The total weight of the filtrate and washings was 509 g.

A sample of the liquid filtrate was analyzed and found to contain 6.59% water extractable iron (II) as iron-amino acid complexes.

TABLE 3

| Ingredient | F. Wt. | Moles | Purity | Wt. | Metal | % Metal |
|---|---|---|---|---|---|---|
| Protein Meal | | 0.601 | | 100.000 | | |
| Hydrochloric Acid (31.5%) | 36.450 | 1.202 | 0.315 | 139.089 | | |
| Water | | | | 83.453 | | |
| Calcium Hydroxide | 74.090 | 0.601 | 0.990 | 44.978 | | |
| Ferrous Sulfate | 278.020 | 0.601 | 1.000 | 167.090 | 33.564 | 6.278 |
| Total | | | | 534.610 | | |

EXAMPLE 12

Large-Scale Production of Zinc-Amino Acid Complexes from the Product of Hydrochloric Acid Hydrolysis of Feather Meal Protein A sample of Feather Meal Protein tested in Example 7 was subjected, on a large-scale to hydrolysis with 6N Hydrochloric Acid according to the formula shown in TABLE 4. The required amount of 6N Hydrochloric Acid was heated to 70° C. with vigorous agitation. The Feather Meal protein was added with continued heating and agitation. The reaction mixture was heated at 140° C. for 1 hour. The reaction mixture was cooled and a small sample of the liquid was removed for analysis and use in the preparation of Examples 9 and 11. The reaction mixture was heated to about 70° C. and zinc oxide was added slowly with continued agitation. After all the zinc oxide was added the mixture was heated at 100° C. for 1 hour. The liquid was added to the carrier in the appropriate ratio as required for optimum operation of the industrial drier. The product was dried to 5% moisture content.

A sample of the dried product was analyzed and found to contain:
1) Water Extractable Zinc=10.27%
2) Zinc-Amino Acid Complex=9.65%
3) Total Amino Acids=23.03%
4) Percent of Metal Present as Amino Acid Complex= 94.00%

TABLE 4

| Ingredient | F. Wt. | Moles | Purity | Wt. | Solids | Metal | % Metal |
|---|---|---|---|---|---|---|---|
| Protein Meal | | 0.601 | | 8646 | 8646 | | |
| Hydrochloric Acid (31.5%) | 36.45 | 1.202 | 0.315 | 12026 | 3680 | | |
| Water | | | | 7215 | | | |
| Zinc Oxide | 81.39 | 0.601 | 0.961 | 4400 | 3397 | 3397 | 10.50 |
| Subtotal | | | | 32287 | 15723 | | |
| Carrier Blend | | | | 16629 | 16629 | | |
| Total | | | | 48916 | 32352 | | |

What is claimed is:

1. In the process of preparing trace element/amino acid complexes from soy protein source, the improvement comprising:
    using as the soy protein source a blend of soy isolate and soy concentrate wherein the amount of soy concentrate does not exceed 50% by weight of the blend.

2. The process of claim 1 wherein the blend of soy isolate and soy concentrate is from 50% by weight to 80% by weight soy isolate and from 20% by weight to 50% by weight soy concentrate.

3. The process of claim 1 wherein the blend is acid hydrolyzed in hydrolyzing acid heated to at least 70° C. to provide single amino acid moieties.

4. The process of claim 3 wherein the blend is slowly added to the heated acid with simultaneous agitation.

5. The process of claim 3 wherein hydrolyzing to produce single amino acid moieties occurs with heating of the acid/soy blend is at temperatures of from 100° C. to 150° C. for from 1 to 12 hours.

6. The process of claim 3 wherein the hydrolyzing acid is about 6N hydrochloric acid.

7. The process of claim 3 wherein the hydrolyzing acid is 6N–8N sulfuric acid.

8. A process of preparing trace element/amino acid complexes from soy protein, comprising:
    blending soy isolate and soy concentrate wherein the amount of soy concentrate does not exceed 50% by weight of the blend;
    adding the blend slowly to hydrolyzing acid heated to at least 70° C. while agitating; and thereafter
    heating the hydrolyzing acid/soy blend at temperatures between about 100° C. and about 150° C. for from 1 to 12 hours to hydrolyze the protein to single amino acid moieties; and thereafter
    reacting the single amino acid moieties with a soluble trace mineral source to form trace element/amino acid complexes.

9. The process of claim 8 wherein the trace element is selected from the group consisting of copper, iron, manganese and zinc.

10. The process of claim 8 wherein the hydrolyzing acid is selected from the group of hydrochloric and sulfuric acids.

11. The process of claim 10 wherein the hydrolyzing acid is about 6N hydrochloric acid.

12. The process of claim 11 wherein the hydrolyzing acid is sulfuric acid that is 6N–8N.

13. The process of claim 9 wherein the trace element is derived from is from oxides and inorganic acid salts of the trace element.

14. A trace element amino acid complex mineral supplement wherein the amino acid source is derived from a blend of soy isolate and soy concentrate, comprising:
    a trace element selected from the group consisting of copper, iron, manganese and zinc, combined with a single amino acid moiety derived from a blend of soy isolate and soy concentrate with the amount of concentrate not exceeding 50% by weight; and
    a suitable carrier for the trace element/amino acid complex.

15. The mineral supplement of claim 14 wherein the blend of soy isolate and soy concentrate is from 50% by weight to 80% by weight soy isolate and from 20% by weight to 50% by weight soy concentrate.

* * * * *